June 26, 1934. J. P. HANSEN 1,964,631
TERMINAL AND SLIDING FASTENER FOR LINES
Filed Nov. 19, 1932
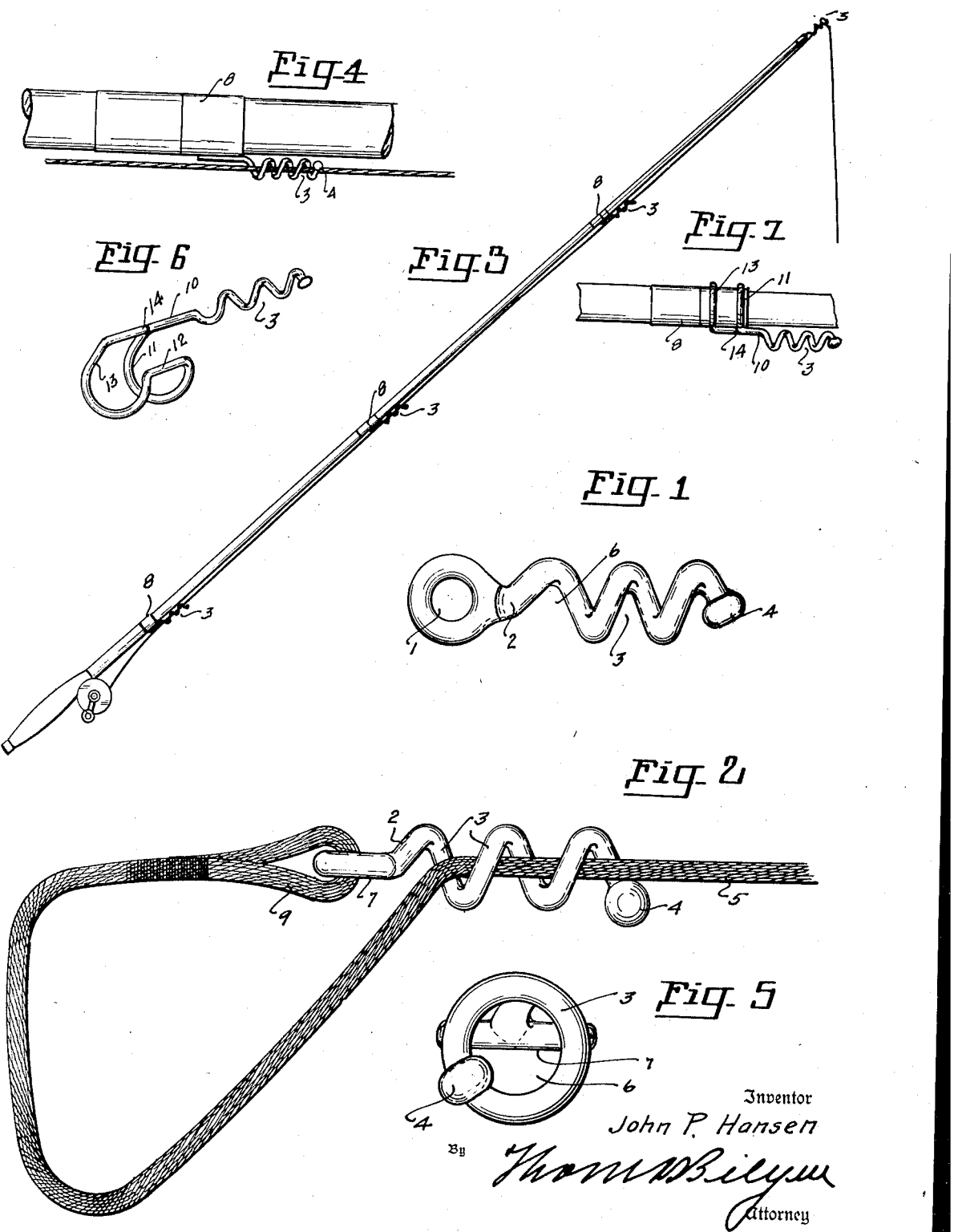
Inventor
John P. Hansen Patented June 26, 1934

1,964,631

UNITED STATES PATENT OFFICE 1,964,631

TERMINAL AND SLIDING FASTENER FOR LINES

John P. Hansen, Troutdale, Oreg.

Application November 19, 1932, Serial No. 643,433

1 Claim. (Cl. 24—123)

My invention relates to a line terminal that is adapted for placement upon lines, cables, ropes, cords, chains and the like.

The primary purpose and object of my invention is to provide a terminal that will provide a device that will run freely along the line and yet, the line, cable, or chain may be freely placed into and be freely disengaged therefrom at any point of the line.

The invention is comprised of a single piece, preferably having an eye to adapt the same for being secured to the line, rope, or chain and having a spirally formed body and a button terminal head, with the flutes of the spiral being sufficiently spaced to permit the line being passed therethrough and for being entered into the spiral at any point, or within any one of the spirals.

The primary purpose and object of my invention is to provide a terminal, or an eye, into which, and through which the line may be made to freely run and to which the same may be engaged and disengaged freely and without loss of time.

A still further object of my invention consists in providing a one piece unit that is easily made and one that will have a long, useful life, and one that will be free from operating annoyances.

With these and incidental objects in view, the invention consists in certain novel features of construction and combination of parts, the essential elements of which are set forth in the appended claim, and a preferred form of embodiment of which is hereinafter shown with reference to the drawing which accompanies and forms a part of this specification.

In the drawing:

Fig. 1 is a side view, of the assembled device.

Fig. 2 is an edge view, of the assembled device shown in use upon the end of the rope. In this view the device is being used as a choker.

Fig. 3 illustrates a plurality of my new and improved devices, shown associated with a fishing rod.

Fig. 4 is a sectional view of a fishing rod, illustrating one of my new and improved devices disposed at the joint, and into which the line may be threaded without delay at the jointing and unjointing of the pole.

Fig. 5 is an end view, of the assembled device, the same being of the end opposite that to which the eye is attached.

Fig. 6 is a perspective, side view, of a modified form of my device made of a single piece of material and so formed as to permit a running free running through the spiral disposed at the free end of the device and illustrating a clamp disposed at the oppositely disposed end to facilitate its placement upon any object, as upon a fish pole.

Fig. 7 is a side view of a device illustrated in Fig. 6 and shown in clamped position upon a supporting object.

Like reference characters refer to like parts throughout the several views.

My device is made of a single piece having an eye 1 disposed at the base end and an offset 2 is disposed adjacent the eye and a plurality of spirals are disposed within the body.

I place a button 4 at the terminal end of the material from which the device is made. This produces a fastener through which a line 5 may be run and it permits a free running of the line through the opening 6 that is disposed longitudinally of the device. It also permits the splicing of an eye 9 of the line within the eye 1 of the device. The spacings 3 of the spirals should be sufficiently large to permit the free entry of the line within the space formed by the spirals.

It may be found desirable in certain classes of work to offset eye 7, as illustrated in dotted position in Fig. 5 to provide a free opening 6 longitudinally of the assembly that will permit a free running of the line within the space 6 and without the same engaging and contacting with the inner side wall 7 of the eye of the device.

My device is particularly adapted for use upon fishing poles with one of the devices being placed at each joint 8 of the pole. A fishing pole, thus equipped permits the placing of the line within the device, so that the line will be held in close proximity to the pole, and it does not require the removal of the sinker, the leader, or the hooks from the line to permit the same being placed therein after the pole has been jointed together.

In Fig. 6 I have shown the head of the device upon which the spirals 3 are spaced as having a shank 10 rearwardly extending therefrom. An offset 11 is disposed at the termination of the shank 10. The offset 11 is formed into a segment of a circle. A second segment of a circle is formed at 13. The two segment circles being spaced apart by a part of the material, as illustrated at 12. The material from which the device is made, as illustrated at Fig. 6, is preferably made of spring material and the spacer portion 12 is preferably formed parallelly to the shank 10 and parallelly to the center line about which the spirals 3 are disposed.

A lug 14 is disposed parallelly to the spacer 12 and has a common center line with that of the shank 10. The lug 14 is secured to the body of the device as by being spot welded thereto. This form of construction provides a hook shaped clamping base to facilitate the attachment and detachment of the device to any supporting object, as to the units of a fishing pole.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claim which follows.

What I claim is:

A device of the class described formed of a single piece of material and comprising a spiraled portion at one of its ends terminating in a button, its opposite end being turned at right angles to itself then into a substantially semi-circular portion thence rearwardly therefrom and into another semi-circular portion arranged parallel with the first mentioned semi-circular portion, to form a clamping means for engagement with an object arranged parallel with said spiraled portion.

JOHN P. HANSEN.